United States Patent
Saito

(10) Patent No.: US 10,502,388 B2
(45) Date of Patent: Dec. 10, 2019

(54) VEHICLE LAMP

(71) Applicant: STANLEY ELECTRIC CO., LTD., Tokyo (JP)

(72) Inventor: Hirokazu Saito, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/015,044

(22) Filed: Jun. 21, 2018

(65) Prior Publication Data

US 2018/0372296 A1    Dec. 27, 2018

(30) Foreign Application Priority Data

Jun. 22, 2017 (JP) ................... 2017-122113

(51) Int. Cl.
   *F21S 43/245*  (2018.01)
   *F21S 43/237*  (2018.01)
   *F21S 43/249*  (2018.01)
   *B60Q 1/44*    (2006.01)

(52) U.S. Cl.
   CPC .............. *F21S 43/245* (2018.01); *B60Q 1/44* (2013.01); *F21S 43/237* (2018.01); *F21S 43/249* (2018.01)

(58) Field of Classification Search
   CPC .. F21S 43/237; F21S 43/249; F21W 2103/35; G02B 6/0005
   See application file for complete search history.

(56) References Cited

U.S. PATENT DOCUMENTS

2015/0276162 A1* 10/2015 Shibuya ............... G02B 6/0005
                                                    362/518
2016/0245973 A1    8/2016 Osaka et al.

FOREIGN PATENT DOCUMENTS

| EP | 1154198 B1 | 6/2006 |
| JP | 2002-190917 A | 7/2002 |
| JP | 2008-140726 A | 6/2008 |
| JP | 2016-157552 A | 9/2016 |

\* cited by examiner

*Primary Examiner* — Joseph L Williams
*Assistant Examiner* — Jacob R Stern
(74) *Attorney, Agent, or Firm* — Kenealy Vaidya LLP

(57) ABSTRACT

Provided is a vehicle lamp capable of uniformly emitting light, which is emitted from light sources and incident on one end surface and the other end surface, from the front surface (lateral surface) thereof. The vehicle lamp includes a light guiding rod extending in a prescribed direction. The light guiding rod includes a front surface, and a rear surface. The front surface includes a first region, a second region, and a third region positioned between the first region and the second region. The first region and the second region are configured to diffuse the light emitted from the first light source and the light emitted from the second light source, in a direction orthogonal to the prescribed direction, respectively. A rear surface is configured to diffuse the light emitted from the first light source and the light emitted from the second light source, in the prescribed direction.

11 Claims, 9 Drawing Sheets

VEHICLE LAMP

CROSS-REFERENCE TO RELATED APPLICATION

This application is based upon and claims the benefit of priority of the prior Japanese Patent Application No. 2017-122113, filed on Jun. 22, 2017, the entire contents of which are incorporated herein by reference.

FIELD

The present invention relates to a vehicle lamp and, in particular, to a vehicle lamp capable of realizing uniform light emission without generating spotlight.

BACKGROUND

Conventionally, there has been known a vehicle lamp using a light guiding rod including an outer peripheral surface (lateral surface) that emits light emitted from light sources and incident on one end surface and the other end surface (see, for example, European Patent No. 1154198 (Specification) (FIG. 1 or the like)).

SUMMARY

However, a vehicle lamp disclosed in European Patent No. 1154198 (Specification) has a difficulty in uniformly emitting light, which is emitted from light sources and incident on one end surface and the other end surface, from the outer peripheral surface (lateral surface) thereof (and thus has a difficulty in realizing uniform light emission).

The present invention has been made in view of the above circumstances and has an object of providing a vehicle lamp capable of uniformly emitting light, which is emitted from light sources and incident on one end surface and the other end surface, from the outer peripheral surface (lateral surface) thereof (and thus capable of realizing uniform light emission).

In order to achieve the above object, a first aspect of the present invention provides a vehicle lamp including: a light guiding rod extending in a prescribed direction, wherein an outer peripheral surface of the light guiding rod includes a first surface arranged on a front side thereof, and a second surface arranged on a rear side thereof opposite to the front side, the first surface includes a first region on a side of one end surface of the light guiding rod, a second region on a side of the other end surface of the light guiding rod, and a third region positioned between the first region and the second region and emitting light emitted from a first light source and incident on the one end surface and light emitted from a second light source and incident on the other end surface, the first region and the second region are configured to diffuse the light emitted from the first light source and the light emitted from the second light source, in a direction orthogonal to the prescribed direction, respectively, and the second surface is configured to diffuse the light emitted from the first light source and the light emitted from the second light source, in the prescribed direction.

According to the aspect, it is possible to provide a vehicle lamp capable of uniformly emitting light, which is emitted from light sources and incident on one end surface and the other end surface, from the outer peripheral surface (lateral surface) thereof (and thus capable of realizing uniform light emission).

In other words, when light emitted from a first light source and incident on one end surface of a light guiding rod (and light emitted from a second light source and incident on the other end surface of the light guiding rod) are guided toward the other end surface of the light guiding rod (and the one end surface of the light guiding rod), respectively, the light is firstly reflected by the inner surface of a first surface (a first region and a second region) to be diffused in a vertical direction and secondly reflected by the inner surface of a second surface to be diffused in a horizontal direction. After that, some of the light emitted from the first light source (and the light emitted from the second light source) and diffused in the vertical direction and the horizontal direction as described above are emitted from the first surface (the third region) of the light guiding rod.

In addition, each of the first region and the second region preferably has, in a circumferential direction of the outer peripheral surface, a plurality of knurls, each of which is convex toward an inside of the light guiding rod and extends in the prescribed direction, the second surface preferably has, in the prescribed direction, a plurality of triangular prism-shaped lens cuts, each of which extends in the direction orthogonal to the prescribed direction, and each of the triangular prism-shaped lens cuts preferably has two lateral surfaces convex toward the inside of the light guiding rod.

Moreover, the outer peripheral surface of the light guiding rod preferably further includes a pair of third surfaces that connects the first surface and the second surface to each other, the first surface is preferably a cylindrical surface convex toward the front side and extending in the prescribed direction, and each of the pair of third surfaces is preferably a curved surface convex toward the inside of the light guiding rod.

Further, a cross section of the first surface in a plane thereof orthogonal to the prescribed direction is preferably a semi-circular shape that is convex toward the front side.

DESCRIPTION OF EMBODIMENTS

Hereinafter, a vehicle lamp 10 according to an embodiment of the present invention will be described with reference to the accompanying drawings. In each figure, corresponding constituents will be given the same symbols, and their duplicated descriptions will be omitted.

Figure 1:
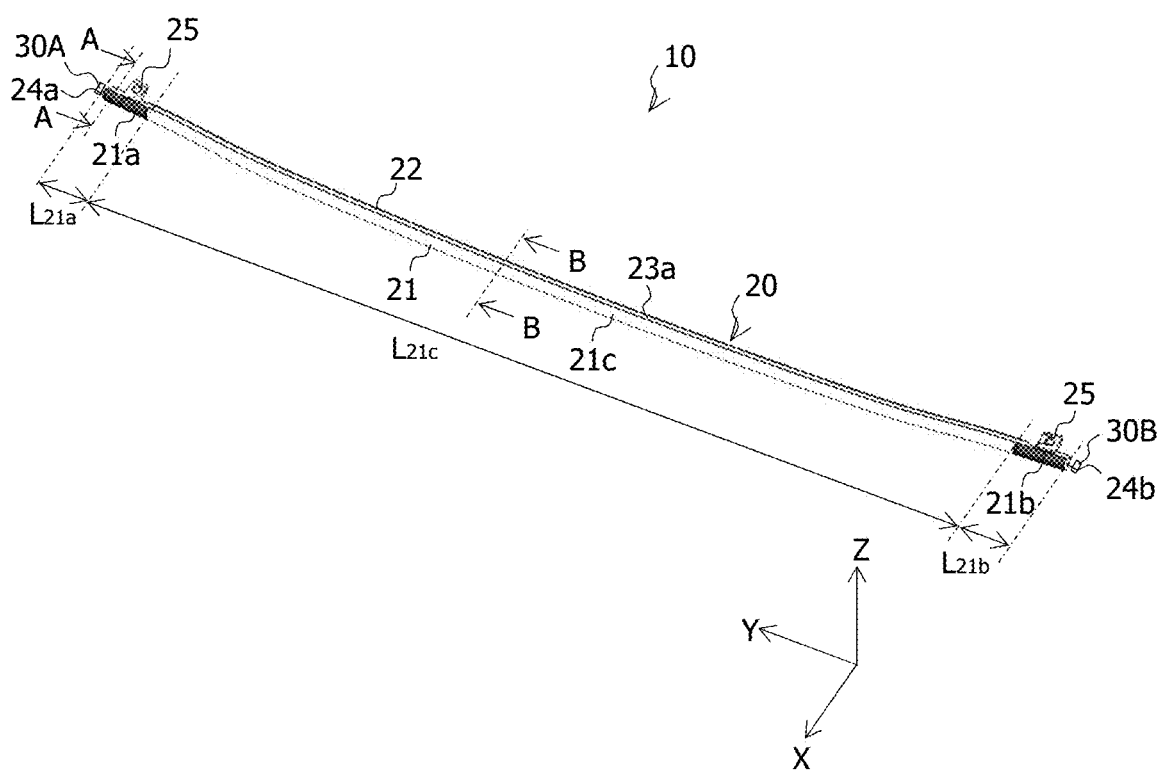
FIG. 1 is a perspective view of a vehicle lamp 10.

FIG. 1 is a perspective view of the vehicle lamp 10.

The vehicle lamp 10 illustrated in FIG. 1 is, for example, a high mount stop lamp and installed between the roof rear end and the upper end of the rear window glass of a vehicle (not illustrated). Note that X, Y, Z axes will be defined below for the purpose of illustration. The X axis extends in the front-rear direction of the vehicle, the Y axis extends in the width direction of the vehicle, and the Z axis extends in the vertical direction of the vehicle.

As illustrated in FIG. 1, the vehicle lamp 10 of the embodiment includes a light guiding rod 20, a first light source 30A, a second light source 30B, or the like. Although not illustrated in FIG. 1, the vehicle lamp 10 is arranged in a lamp chamber constituted by an outer lens and a housing and attached to the housing or the like.

The light guiding rod 20 is a rod-shaped light guiding body extending in substantially the Y-axis direction and includes flange parts 25. The light guiding rod 20 is attached to the housing or the like when the flange parts 25 are screwed to the housing or the like.

Figure 2A:
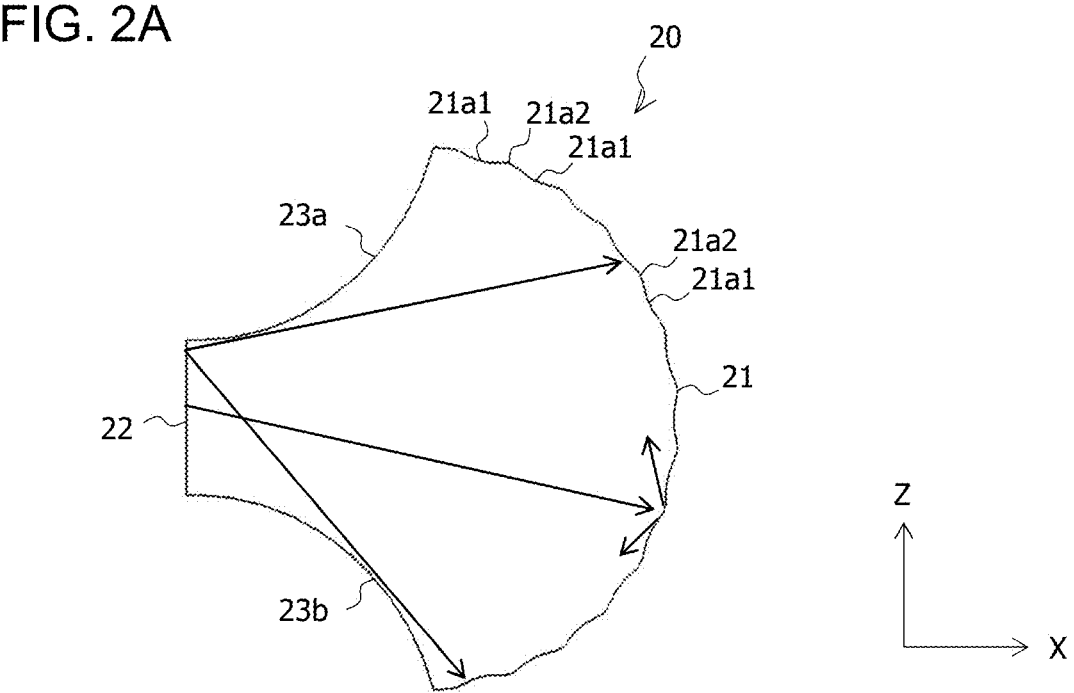
FIG. 2A is an A-A cross-sectional view of a light guiding rod 20 illustrated in FIG. 1.
Figure 2B:
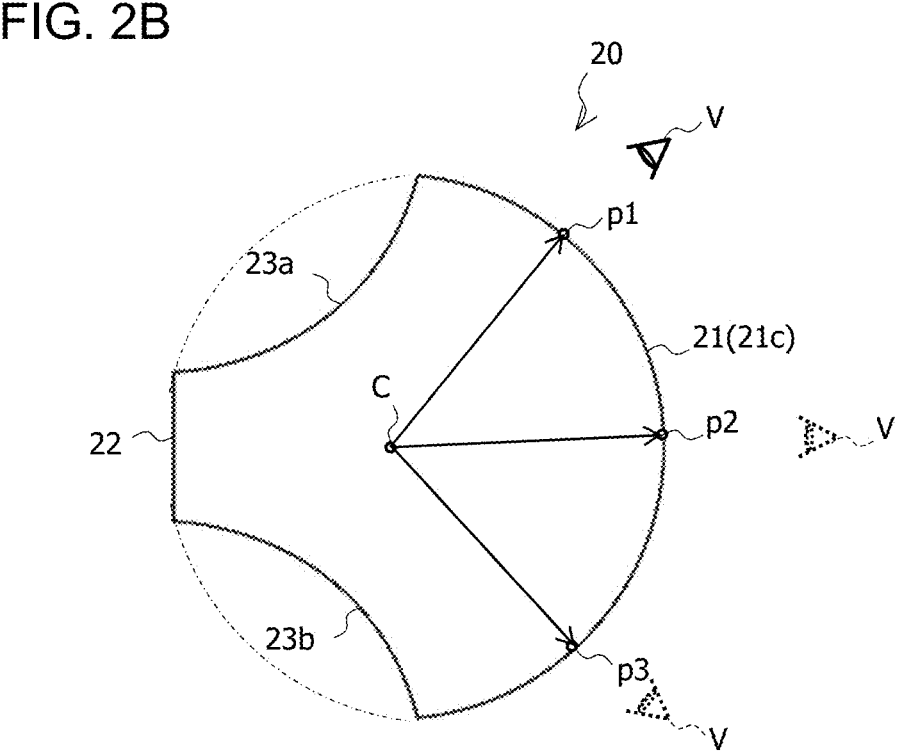
FIG. 2B is a B-B cross-sectional view of the light guiding rod 20 illustrated in FIG. 1.

FIGS. 2A and 2B are an A-A cross-sectional view and a B-B cross-sectional view of the light guiding rod 20 illustrated in FIG. 1, respectively.

As illustrated in FIG. 1 and FIGS. 2A and 2B, the outer peripheral surface (lateral surface) of the light guiding rod 20 includes a first surface 21 arranged on the front side thereof, a second surface 22 arranged on the rear side thereof opposite to the front side, and a pair of upper and lower third surfaces 23a and 23b connecting the first surface 21 and the second surface 22 to each other.

The first surface 21 is a cylindrical surface (see FIG. 1) of which the cross section in an XZ plane is a semi-circular shape (see FIGS. 2A and 2B) convex toward the front side and which extends in the Y-axis direction.

As illustrated in FIG. 1, the first surface 21 includes a first region 21a on the side of one end surface 24a of the light guiding rod 20, a second region 21b on the side of the other end surface 24b of the light guiding rod 20, and a third region 21c positioned between the first region 21a and the second region 21b and emitting light emitted from a first light source 30A and incident on the one end surface 24a and light emitted from a second light source 30B and incident on the other end surface 24b. Hereinafter, the parts of the first region 21a and the second region 21b of the light guiding rod 20 will also be called run-up intervals $L_{21a}$ and $L_{21b}$, respectively. In addition, the part of the third region 21c of the light guiding rod 20 will also be called a design interval $L_{21c}$.

Figure 3:
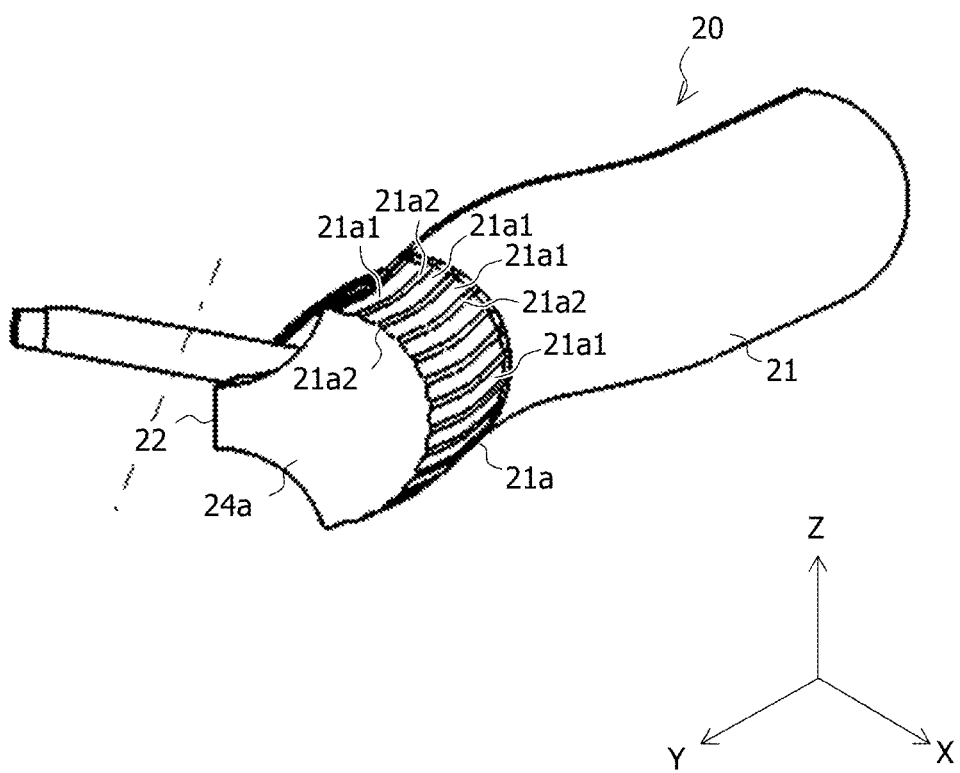
FIG. 3 is a partially-enlarged perspective view of the light guiding rod 20.

FIG. 3 is a partially-enlarged perspective view of the light guiding rod 20.

The first region 21a is configured to diffuse light, which is emitted from the first light source 30A and incident on the first region 21a, in a vertical direction (Z-axis direction in FIG. 2A).

Specifically, as illustrated in FIG. 3, the first region 21a has, in the circumferential direction of the outer peripheral surface of the light guiding rod 20, a plurality of knurls 21a1 (also called knurling cuts or cylindrical surfaces), each of which is convex toward the inside of the light guiding rod 20 (for example, an arc of which the cross section in the XZ plane has a curvature radius R1) and extends in the Y-axis direction. As illustrated in FIG. 2A, light emitted from the first light source 30A and incident on the one end surface 24a of the light guiding rod 20 is reflected by the inner surfaces of the plurality of knurls 21a1 to be diffused in mainly a vertical direction (the Z-axis direction in FIG. 2A). In addition, a plurality of curved surfaces 21a2, each of which is concave toward the inside of the light guiding rod 20 (for example, an arc of which the cross section in the XZ plane has a curvature radius R2) and extends in the Y-axis direction, is provided between the plurality of knurls 21a1 (also called the knurling cuts or the cylindrical surfaces). By the curved surfaces 21a2, the formation of valley parts (edge parts) between the knurls 21a1 and the leakage of light from the valley parts (edge parts) may be prevented.

Similarly, the second region 21b is configured to diffuse light, which is emitted from the second light source 30B and incident on the second region 21b, in the vertical direction (the Z-axis direction in FIG. 2A).

Specifically, although not illustrated in FIG. 3, the second region 21b has, in the circumferential direction of the outer peripheral surface of the light guiding rod 20, a plurality of knurls 21b1 (also called knurling cuts or cylindrical surfaces), each of which is convex toward the inside of the light guiding rod 20 (for example, an arc of which the cross section in the XZ plane has a curvature radius R1) and extends in the Y-axis direction. Light emitted from the second light source 30B and incident on the other end surface 24b of the light guiding rod 20 is reflected by the inner surfaces of the plurality of knurls 21b1 to be diffused mainly in the vertical direction (the Z-axis direction in FIG. 2A). In addition, although not illustrated in FIG. 3, a plurality of curved surfaces 21b2, each of which is concave toward the inside of the light guiding rod 20 (for example, an arc of which the cross section in the XZ plane has a curvature radius R2) and extends in the Y-axis direction, is provided between the plurality of knurls 21b1 (also called the knurling cuts or the cylindrical surfaces). By the curved surfaces 21b2, the formation of valley parts (edge parts) between the knurls 21b1 and the leakage of light from the valley parts (edge parts) may be prevented.

The second surface 22 is a plane parallel to a ZY plane.

Figure 4:
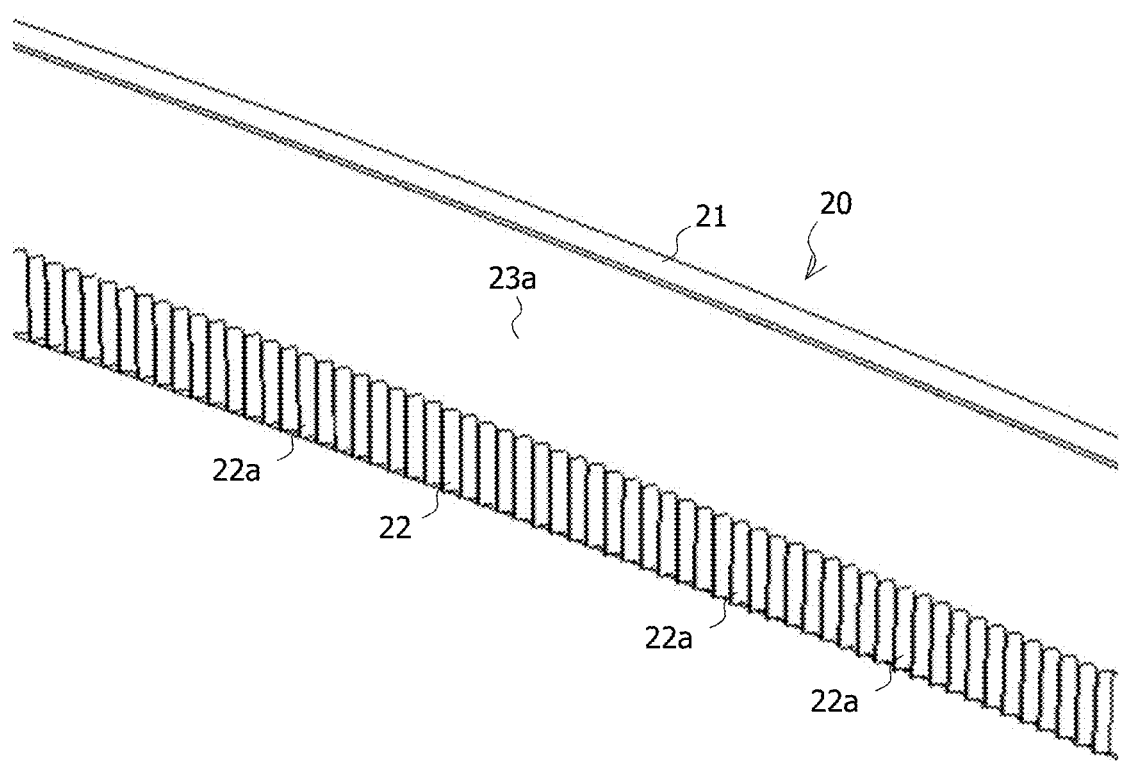
FIG. 4 is a partially-enlarged perspective view of the light guiding rod 20.
Figure 4:
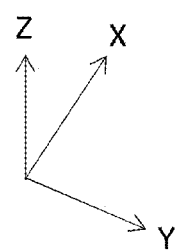

FIG. 4 is a partially-enlarged perspective view of the light guiding rod 20.

Figure 6A:
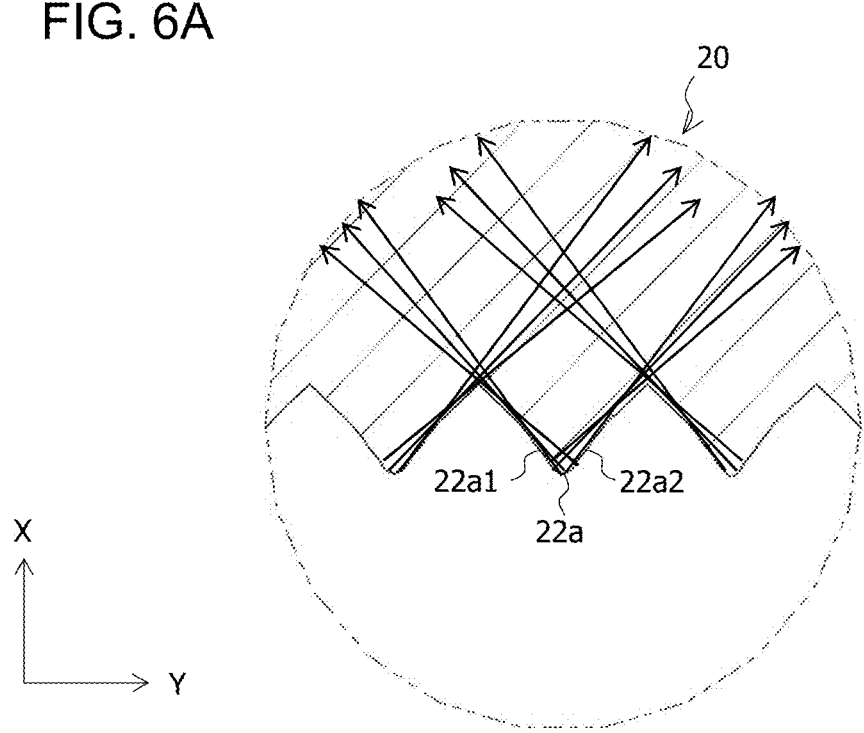
FIG. 6A is a partially-enlarged cross-sectional view in the XY plane of the light guiding rod 20 illustrated in FIG. 4.

The second surface 22 is configured to diffuse light emitted from the first light source 30A and the second light source 30B and incident on the second surface 22 in a horizontal direction (the Y-axis direction in FIG. 6A). Specifically, the second surface 22 is configured as follows.

As illustrated in FIG. 4, the second surface 22 has, in the Y-axis direction, a plurality of triangular prism-shaped lens cuts 22a, each of which has a substantially isosceles triangular cross section in an XY plane and extends in the Z-axis direction.

Figure 5:
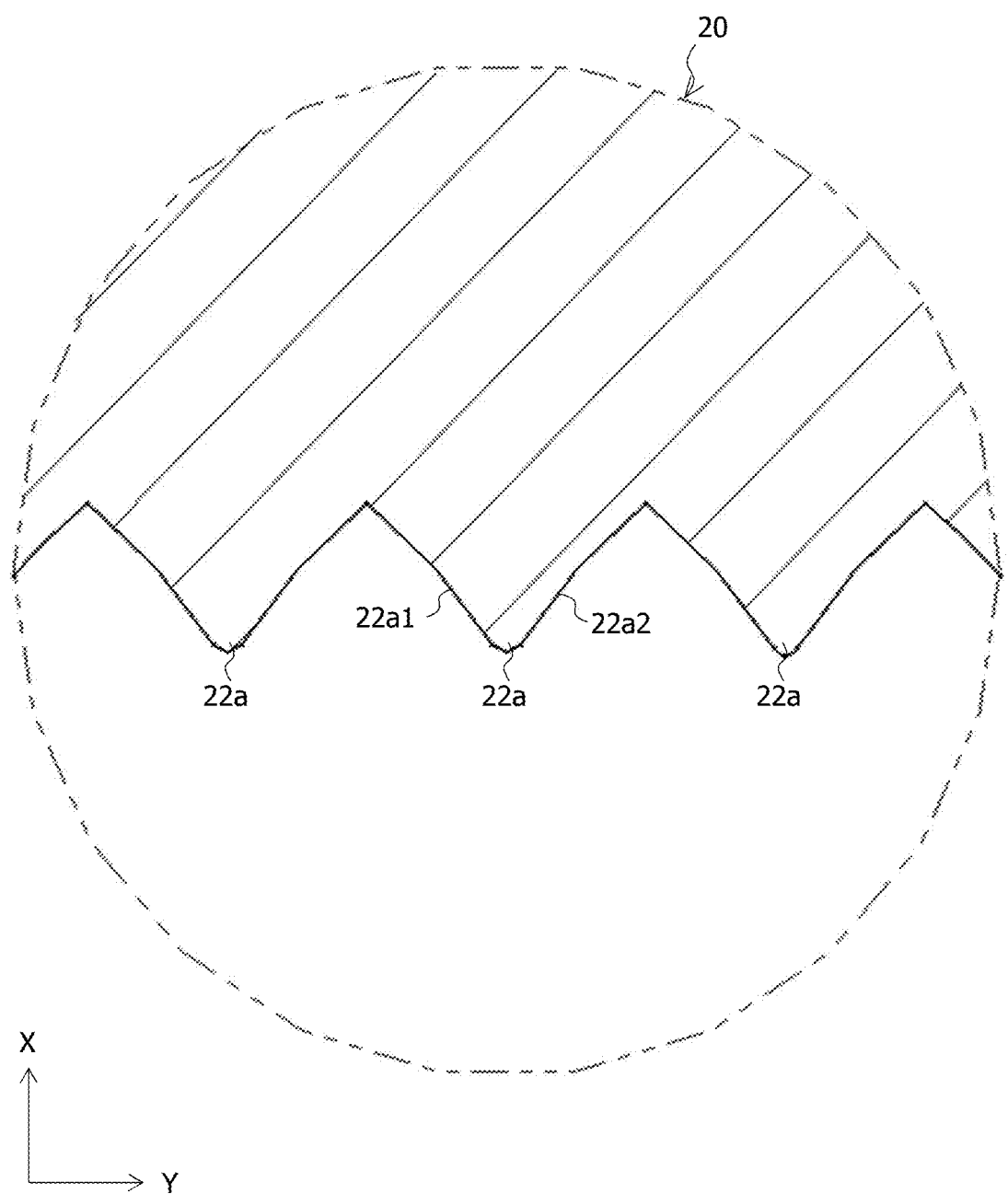
FIG. 5 is a partially-enlarged cross-sectional view in an XY plane of the light guiding rod 20 illustrated in FIG. 4.

FIG. 5 is a partially-enlarged cross-sectional view in the XY plane of the light guiding rod 20 illustrated in FIG. 4.

As illustrated in FIG. 5, each of the triangular prism-shaped lens cuts 22a includes two lateral surfaces 22a1 and 22a2, each of which is convex toward the inside of the light guiding rod 20 (for example, an arc of which the cross section in the XY plane has a curvature radius R3) and extends in the Z-axis direction.

Light emitted from the first light source 30A and incident on the one end surface 24a of the light guiding rod 20 (and light emitted from the second light source 30B and incident on the other end surface 24b) are reflected by the inner surfaces of the respective triangular prism-shaped lens cuts 22a (the two respective lateral surfaces 22a1 and 22a2) to be diffused in mainly the horizontal direction (the Y-axis direction in FIG. 6A). FIG. 6A is a partially-enlarged cross-sectional view in the XY plane of the light guiding rod 20 illustrated in FIG. 4 and illustrates a state in which light emitted from the first light source 30A and incident on the one end surface 24a of the light guiding rod 20 (and light emitted from the second light source 30B and incident on the other end surface 24b of the light guiding rod 20) are diffused in the horizontal direction (the Y-axis direction in FIG. 6A).

As illustrated in FIGS. 2A and 2B, each of the pair of upper and lower third surfaces 23a and 23b is a curved surface of which the cross section in the XZ plane is convex toward the inside of the light guiding rod 20 and extends in the Y-axis direction. Thus, compared with a case in which each of the pair of upper and lower third surfaces 23a and 23b is a curved surface of which the cross section in the XZ plane is concave (see dashed lines in FIG. 2B) toward the inside of the light guiding rod 20 and which extends in the Y-axis direction, light reflected by the inner surface of the second surface 22 (the plurality of triangular prism-shaped lens cuts 22a) and emitted from the first surface 21 (the design interval $L_{21c}$, i.e., the third region 21c) is increased.

The one end surface 24a and the other end surface 24b of the light guiding rod 20 are planes parallel to, for example, the XZ plane.

The first light source 30A is, for example, a red LED (when the vehicle lamp 10 is used as a tail lamp) and fixed to the housing or the like with the light-emitting surface thereof (not illustrated) opposed to the one end surface 24a of the light guiding rod 20. Note that the light axis of the first light source 30A extends in the Y-axis direction.

The second light source 30B is, for example, a red LED (when the vehicle lamp 10 is used as a tail lamp) and fixed to the housing or the like with the light-emitting surface thereof (not illustrated) opposed to the other end surface 24b of the light guiding rod 20. Note that the light axis of the second light source 30B extends in the Y-axis direction.

In the vehicle lamp 10 having the above configuration, when light emitted from the first light source 30A and incident on the one end surface 24a of the light guiding rod 20 (and light emitted from the second light source 30B and incident on the other end surface 24b of the light guiding rod 20) are reflected by the inner surfaces of the first surface 21, the second surface 22, and the pair of upper and lower third surfaces 23a and 23b to be guided toward the other end surface 24b of the light guiding rod 20 (and the one end surface 24a of the light guiding rod 20), the light is firstly reflected by the inner surfaces of the plurality of knurls 21a1 provided on the first surface 21 (the run-up intervals $L_{21a}$ and $L_{21b}$, i.e., the first region 21a and the second region 21b) to be diffused in the vertical direction (the Z-axis direction in FIG. 2A) and secondly reflected by the inner surfaces of the plurality of triangular prism-shaped lens cuts 22a provided on the second surface 22 (the two respective lateral surfaces 22a1 and 22a2 convex toward the inside of the light guiding rod 20) to be diffused in the horizontal direction (the Y-axis direction in FIG. 6A). After that, some of the light emitted from the first light source 30A (and the second light source 30B) and diffused in the vertical direction and the horizontal direction as described above is emitted from the first surface 21 (the design interval $L_{21c}$, i.e., the third region 21c) of the light guiding rod 20.

As described above, light emitted from the first light source 30A and incident on the light guiding rod 20 from the one end surface 24a of the light guiding rod 20 to be guided inside the light guiding rod 20 and light emitted from the second light source 30B and incident on the light guiding rod 20 from the other end surface 24b of the light guiding rod 20 to be guided inside the light guiding rod 20 are diffused in the vertical direction and the horizontal direction and emitted from the design interval $L_{21c}$ (the third region 21c) of the light guiding rod 20, whereby the design interval $L_{21c}$ (the third region 21c) of the light guiding rod 20 uniformly or substantially uniformly emits light.

Next, the effects of the light guiding rod 20 having the above configuration will be described in comparison with comparative examples.

Figure 7:
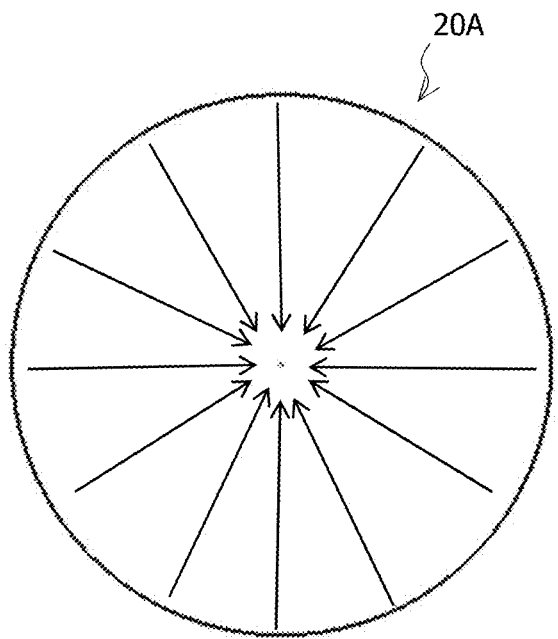
FIG. 7 is a diagram illustrating the cross-sectional shape of the run-up intervals $L_{21a}$ and $L_{21b}$ of a first comparative example.
Figure 8:
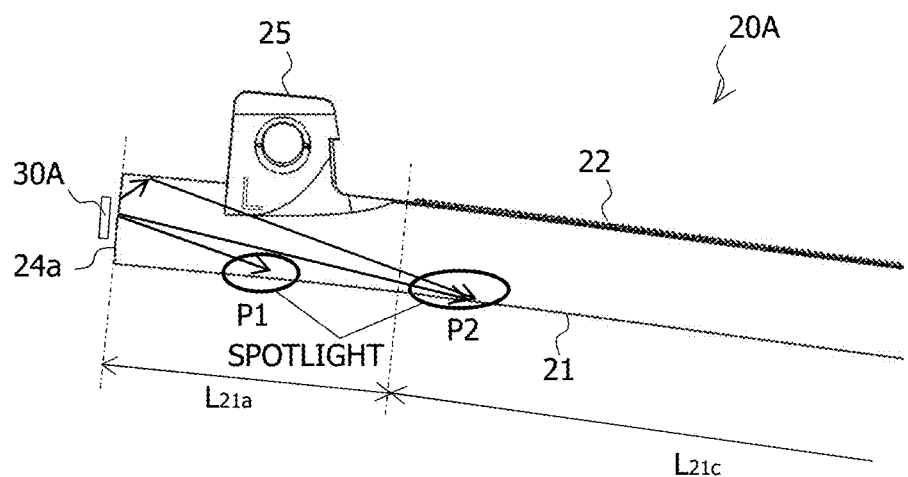
FIG. 8 is a diagram for illustrating a state in which spotlight is generated in a light guiding rod 20A of the first comparative example.

FIG. 7 is a diagram illustrating the cross-sectional shape of the run-up intervals $L_{21a}$ and $L_{21b}$ of a first comparative example. FIG. 8 is a diagram for illustrating a state in which spotlight is generated in a light guiding rod 20A of the first comparative example.

When compared with the above light guiding rod 20, the light guiding rod 20A of the first comparative example is different in that the cross-sectional shape of the run-up intervals $L_{21a}$ and $L_{21b}$ is not a shape as illustrated in FIG. 2A but is a circular shape as illustrated in FIG. 7, the run-up intervals $L_{21a}$ and $L_{21b}$ (first region 21a and second region 21b) do not have knurls 21a1 and 21b1, respectively, and a complicated surface shape (distorted surface shape) is formed as the parts between the run-up intervals $L_{21a}$ and $L_{21b}$ and a design interval $L_{21c}$ change gradually. Besides the above points, the configuration of the light guiding rod 20A is the same as that of the light guiding rod 20.

After study by the present inventor, it turns out that in the light guiding rod 20A of the first comparative example, spotlight is firstly generated in the run-up interval $L_{21a}$ (first surface 21) (see P1 in FIG. 8) when direct light emitted from a first light source 30A is incident on the run-up interval $L_{21a}$ (the first surface 21), and that spotlight is secondly generated in the design interval $L_{21c}$ (the first surface 21) (see P2 in FIG. 8) when reflected light (see FIG. 7) reflected and condensed in the run-up interval $L_{21a}$ (circular cross-section) is incident on the design interval $L_{21c}$ (the first surface 21) as illustrated in FIG. 8. Note that spotlight is also generated in a run-up interval $L_{21b}$ (first surface 21) when direct light emitted from a second light source 30B is incident on the run-up interval $L_{21b}$ (the first surface 21).

On the other hand, reduction in spotlight in the run-up intervals $L_{21a}$ and $L_{21b}$ (the first surface 21) and reduction in spotlight in the design interval $L_{21c}$ (the first surface 21) are allowed in the light guiding rod 20 of the above embodiment.

Reduction in spotlight in the run-up interval $L_{21a}$ (the first surface 21) is allowed since direct light emitted from the first light source 30A is reflected by the inner surfaces of the plurality of knurls 21a1 provided in the run-up interval $L_{21a}$ (the first region 21a) to be diffused in the vertical direction (the Z-axis direction in FIG. 2A). Similarly, reduction in spotlight in the run-up interval $L_{21b}$ (the first surface 21) is allowed since direct light emitted from the second light source 30B is reflected by the inner surfaces of the plurality of knurls 21b1 provided in the run-up interval $L_{21b}$ (the second region 21b) to be diffused in the vertical direction (the Z-axis direction in FIG. 2A).

Reduction in spotlight in the design interval $L_{21c}$ (the first surface 21) is allowed since the cross-sectional shape of the run-up intervals $L_{21a}$ and $L_{21b}$ is not the circular shape as illustrated in FIG. 7 but is the shape as illustrated in FIG. 2A. In other words, this is because since the cross-sectional shape of the run-up intervals $L_{21a}$ and $L_{21b}$ is not the circular shape as illustrated in FIG. 7, reflected light reflected in the run-up intervals $L_{21a}$ and $L_{21b}$ (circular cross-section) is incident on the design interval $L_{21c}$ (the first surface 21) without being condensed (or without being approximately condensed).

In addition, it turns out that, in the light guiding rod 20A of the first comparative example, the shape of the surface between the run-up intervals $L_{21a}$ and $L_{21b}$ and the design interval $L_{21c}$ changes gradually to form a complicated surface shape (distorted surface shape). As a result, when the light is incident on the complicated surface shape (distorted surface shape), light is totally reflected, a beam of the light is lost (reduced), and the light is not guided (and thus uniform light emission is not able to be realized).

On the other hand, since the cross-sectional shape of the run-up intervals $L_{21a}$ and $L_{21b}$ and the cross-sectional shape of the design interval $L_{21c}$ are substantially the same in the light guiding rod 20 of the above embodiment (whereby a complicated surface shape (distorted surface shape) is not formed between the run-up intervals $L_{21a}$ and $L_{21b}$ and the design interval $L_{21c}$), a state in which light is not guided due to loss (reduction) in a beam of the light is prevented. As a result, it is possible to realize uniform light emission.

Figure 6B:
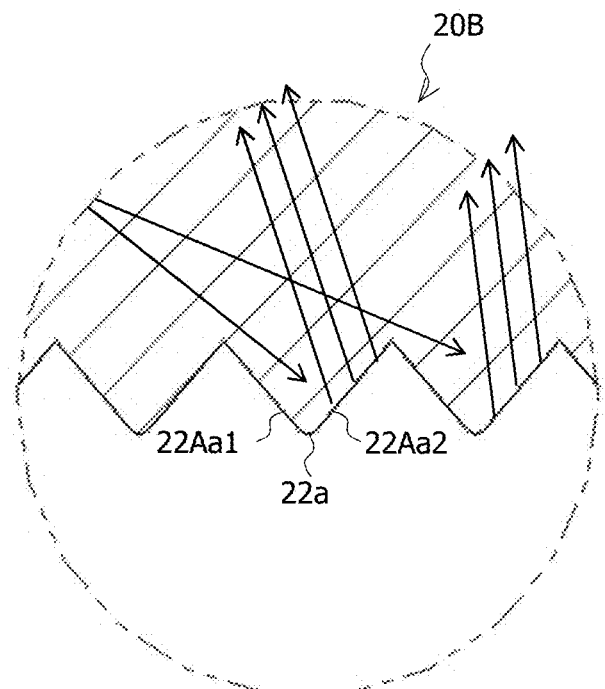
FIG. 6B is a partially-enlarged cross-sectional view in an XY plane of a light guiding rod 20B of a second comparative example.

When compared with the above light guiding rod 20, a light guiding rod 20B of a second comparative example is different in that run-up intervals $L_{21a}$ (first region 21a) and $L_{21b}$ (second region 21b) do not have knurls 21a1 and 21b1, respectively, and each of triangular prism-shaped lens cuts 22a has plane-shaped lateral surfaces 22Aa1 and 22Aa2 as illustrated in FIG. 6B unlike the two lateral surfaces 22a1 and 22a2 convex toward the inside of the light guiding rod 20. Other than the above points, the configuration of the light guiding rod 20B is the same as that of the light guiding rod 20. FIG. 6B is a partially-enlarged cross-sectional view in an XY plane of the light guiding rod 20B of the second comparative example.

After study by the present inventor, it turns out that a design interval $L_{21c}$ (third region 21c) in the light guiding rod 20B of the second comparative example is not allowed to uniformly emit light (light emission unevenness occurs) example compared with the light guiding rod 20 of the embodiment.

Figure 9A:
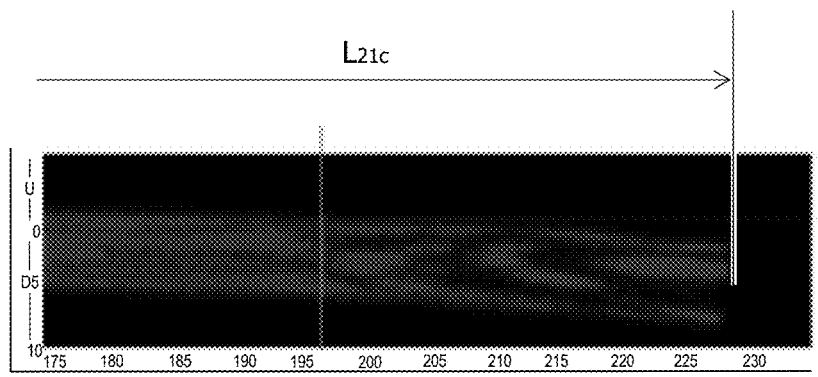
FIG. 9A is a diagram illustrating the brightness distribution of the light guiding rod 20B when seen from the front side thereof.
Figure 9B:
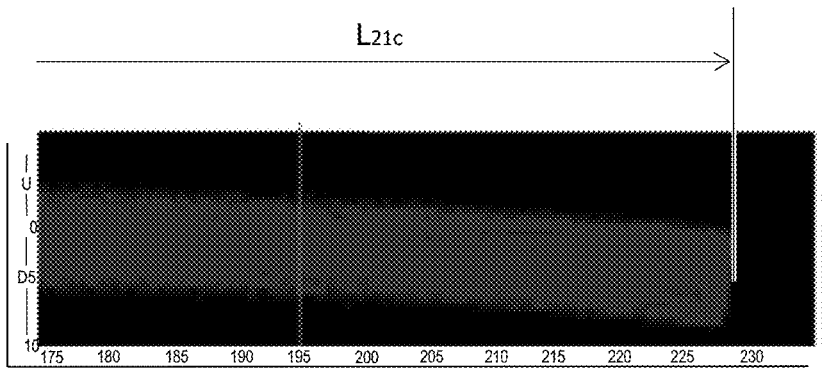
FIG. 9B is a diagram illustrating the brightness distribution of the light guiding rod 20 when seen from the front side thereof.

FIG. 9A is a diagram illustrating the brightness distribution of the light guiding rod 20B when seen from the front side thereof, and FIG. 9B is a diagram illustrating the brightness distribution of the light guiding rod 20 when seen from the front side thereof.

By referring to FIG. 9A, it appears that the design interval $L_{21c}$ (third region 21c), which is the same as that of the light guiding rod 20 of the embodiment, in the light guiding rod 20B of the second comparative example is not allowed to uniformly emit light (light emission unevenness occurs).

On the other hand, by referring to FIG. 9B, it appears that the design interval $L_{21c}$ (third region 21c) in the light guiding rod 20 of the embodiment is allowed to uniformly emit light compared with the light guiding rod 20B of the second comparative example.

This is because light emitted from the first light source 30A and incident on the light guiding rod 20 from the one end surface 24a of the light guiding rod 20 to be guided inside the light guiding rod 20 and light emitted from the second light source 30B and incident on the light guiding rod 20 from the other end surface 24b of the light guiding rod 20 to be guided inside the light guiding rod 20 are diffused in the vertical direction and the horizontal direction and emitted from the design interval $L_{21c}$ (the third region 21c) of the light guiding rod 20.

As described above, according to the embodiment, light emitted from the first light source 30A and incident on the one end surface 24a and light emitted from the second light source 30B and incident on the other end surface 24b of the light guiding rod 20 may be uniformly emitted from the outer peripheral surface (the design interval $L_{21c}$, i.e., the third region 21c). As a result, uniform light emission (or substantially uniform light emission) can be realized in the design interval $L_{21c}$ (i.e., the third region 21c) without the generation of spotlight.

This is because, when light emitted from the first light source 30A and incident on the one end surface 24a of the light guiding rod 20 (and light emitted from the second light source 30B and incident on the other end surface 24b of the light guiding rod 20) are reflected by the inner surfaces of the first surface 21, the second surface 22, and the pair of upper and lower third surfaces 23a and 23b to be guided toward the other end surface 24b of the light guiding rod 20 (and the one end surface 24a of the light guiding rod 20), the light is firstly reflected by the inner surfaces of the plurality of knurls 21a1 and 21b1 provided on the first surface 21 (the run-up intervals $L_{21a}$ and $L_{21b}$, i.e., the first region 21a and the second region 21b) to be diffused in the vertical direction (the Z-axis direction in FIG. 2A) and secondly reflected by the inner surfaces of the plurality of triangular prism-shaped lens cuts 22a (the two lateral surfaces 22a1 and 22a2 convex toward the inside of the light guiding rod 20) provided on the second surface 22 to be diffused in the horizontal direction (in the Y-axis direction in FIG. 6A). After that, some of the light emitted from the first light source 30A (and the light emitted from the second light source 30B) and diffused in the vertical direction and the horizontal direction as described above is emitted from the first surface 21 (the design interval $L_{21c}$, i.e., the third region 21c) of the light guiding rod 20.

In addition, according to the embodiment, the cross section of the first surface 21 in the XZ plane is a semi-circular shape, and all the distances between a central point C and arbitrary points (see, for example, p1, p2, and p3) on the cross section of the first surface 21 in the XZ plane are the same as illustrated in FIG. 2B. Therefore, even if a visual point position V is set in any place in the Z-axis direction, the uniform light emission of the light guiding rod 20 is visually recognizable in the design interval $L_{21c}$ (third region 21c) of the light guiding rod 20.

Note that when at least one of the pitch and the size of the triangular prism-shaped lens cuts 22a, the curvature radius R1 of each of the knurls 21a1 and 21b1, and the surface shape (for example, the curvature radius R3 of the lateral surfaces 22a1 and 22a2) of the two lateral surfaces 22a1 and 22a2 of each of the triangular prism-shaped lens cuts 22a is changed (adjusted) by, for example, prescribed simulation software and the light paths of light emitted from the first light source 30A and the second light source 30B and incident on the light guiding rod 20 are confirmed (tracked) according to the change, conditions under which the design interval $L_{21c}$ (i.e., the third region 21c) uniformly emits light (or substantially uniformly emits light) (the conditions of the pitch and the size of the triangular prism-shaped lens cuts 22a, the curvature radius R1 of each of the knurls 21a1 and 21b1, the surface shape of the two lateral surfaces 22a1 and 22a2 of each of the triangular prism-shaped lens cuts 22a, or the like) may be found.

Figure 10:
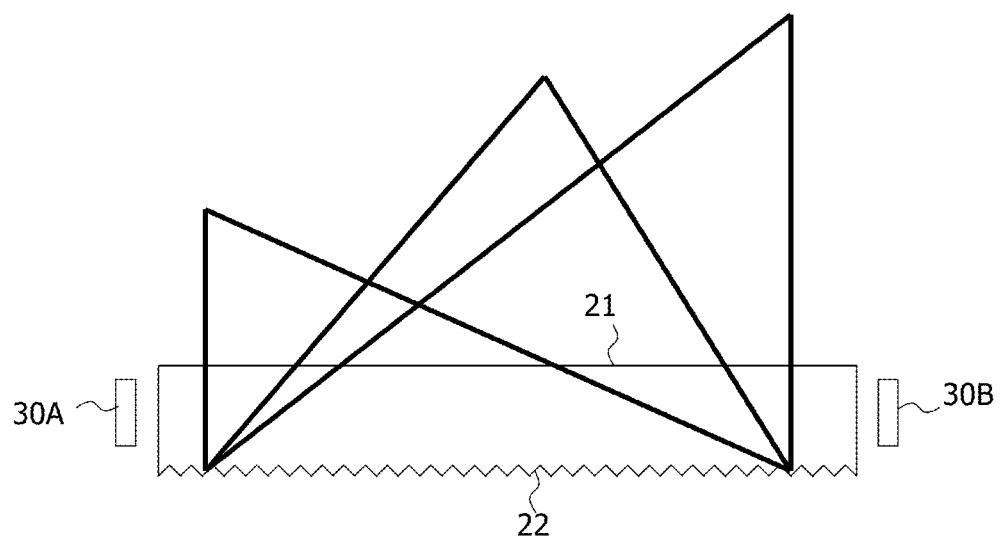
FIG. 10 is a diagram illustrating a state in which light emitted from a first light source 30A (and light emitted from a second light source 30B) are controlled in an arbitrary direction and at an arbitrary distance.

In addition, according to the embodiment, when at least one of the pitch and the size of the triangular prism-shaped lens cuts 22a, the curvature radius R1 of each of the knurls 21a1 and 21b1, and the surface shape (for example, the curvature radius R3 of the lateral surfaces 22a1 and 22a2) of the two lateral surfaces 22a1 and 22a2 of each of the triangular prism-shaped lens cuts 22a is changed, light emitted from the first light source 30A (and light emitted from the second light source 30B) may be made uniform in an arbitrary direction and at an arbitrary distance as illustrated in FIG. 10. FIG. 10 is a diagram illustrating a state in which light emitted from the first light source 30A (and light emitted from the second light source 30B) are controlled in an arbitrary direction and at an arbitrary distance.

Next, modified examples will be described.

The above embodiment describes an example in which the vehicle lamp of the present invention is applied to a high mount stop lamp, but the vehicle lamp of the present invention is not limited to this. For example, the vehicle lamp of the present invention may be applied to a general vehicle lamp such as a head lamp, a lid lamp (a lamp attached to a movable part such as a backdoor and a trunk), and an interior lamp.

In addition, the above embodiment describes an example in which the first region 21a has the plurality of knurls 21a1, but the first region 21a is not limited to this. That is, the first region 21a is preferably configured such that light emitted from the first light source 30A and incident on the first region 21a is diffused in the vertical direction (the Z-axis direction in FIG. 2A). Therefore, the first region 21a may have lens cuts other than the knurls 21a1 so long as they are allowed to diffuse the light emitted from the first light source 30A and incident on the first region 21a in the vertical direction (the Z-axis direction in FIG. 2A).

Similarly, the above embodiment describes an example in which the second region 21b has the plurality of knurls 21b1, but the second region 21b is not limited to this. That is, the second region 21b is preferably configured such that light emitted from the second light source 30B and incident on the second region 21b is diffused in the vertical direction (the Z-axis direction in FIG. 2A). Therefore, the second region 21b may have lens cuts other than the knurls 21b1 so long as they are allowed to diffuse the light emitted from the second light source 30B and incident on the second region 21b in the vertical direction (the Z-axis direction in FIG. 2A).

Moreover, the above embodiment describes an example in which the second surface 22 has the plurality of triangular prism-shaped lens cuts 22a, but the second surface 22 is not limited to this. That is, the second surface 22 is preferably configured such that light emitted from the first light source 30A and the second light source 30B and incident on the second surface 22 is diffused in the horizontal direction (in the Y-axis direction in FIG. 6A). Therefore, the second surface 22 may have lens cuts other than the triangular prism-shaped lens cuts 22a so long as they are allowed to diffuse the light emitted from the first light source 30A and the second light source 30B and incident on the second surface 22 in the horizontal direction (in the Y-axis direction in FIG. 6A).

The respective numerical values in the above embodiments are described only for illustration purpose, and appropriate numerical values different from the numerical values may be used as a matter of course.

The above embodiments are described only for illustration purpose in every respect. The interpretation of the present invention is not limited to the description of the above embodiments. The present invention may be carried out in various other modes without departing from its spirit and principal features.

What is claimed is:

1. A vehicle lamp comprising:
a light guiding rod extending in a prescribed direction, wherein
an outer peripheral surface of the light guiding rod includes a first surface arranged on a front side thereof, and a second surface arranged on a rear side thereof opposite to the front side,
the first surface includes a first region on a side of one end surface of the light guiding rod, a second region on a side of the other end surface of the light guiding rod, and a third region positioned between the first region and the second region and emitting light emitted from a first light source and incident on the one end surface and light emitted from a second light source and incident on the other end surface,
the first region and the second region are configured to diffuse the light emitted from the first light source and the light emitted from the second light source, in a direction orthogonal to the prescribed direction, respectively, and
the second surface is configured to diffuse the light emitted from the first light source and the light emitted from the second light source, in the prescribed direction, wherein
each of the first region and the second region has, in a circumferential direction of the outer peripheral surface, a plurality of knurls, each of which is convex toward an inside of the light guiding rod and extends in the prescribed direction,
the second surface has, in the prescribed direction, a plurality of triangular prism-shaped lens cuts, each of which extends in the direction orthogonal to the prescribed direction, and
each of the triangular prism-shaped lens cuts has two lateral surfaces convex toward the inside of the light guiding rod.

2. The vehicle lamp according to claim 1, wherein
a cross section of the first surface in a plane thereof orthogonal to the prescribed direction is a semi-circular shape that is convex toward the front side.

3. The vehicle lamp according to claim 1, wherein
the plurality of lens cuts is provided on the second surface corresponding to the first region, the second region, and the third region.

4. The vehicle lamp according to claim 1, wherein
the outer peripheral surface of the light guiding rod further includes a pair of third surfaces that connects the first surface and the second surface to each other,
the first surface is a cylindrical surface convex toward the front side and extending in the prescribed direction, and
each of the pair of third surfaces is a curved surface convex toward the inside of the light guiding rod.

5. The vehicle lamp according to claim 4, wherein
a cross section of the first surface in a plane thereof orthogonal to the prescribed direction is a semi-circular shape that is convex toward the front side.

6. A vehicle lamp comprising:
a light guiding rod extending in a prescribed direction, wherein an outer peripheral surface of the light guiding rod includes a first surface arranged on a front side thereof, and a second surface arranged on a rear side thereof opposite to the front side, the first surface includes a first region on a side of one end surface of the light guiding rod, a second region on a side of the other end surface of the light guiding rod, and a third region positioned between the first region and the second region and emitting light emitted from a first light source and incident on the one end surface and light emitted from a second light source and incident on the other end surface, the first region and the second region are configured to diffuse the light emitted from the first light source and the light emitted from the second light source, in a direction orthogonal to the prescribed direction, respectively, and the second surface is configured to diffuse the light emitted from the first light source and the light emitted from the second light source, in the prescribed direction, wherein each of the first region and the second region has, in a circumferential direction of the outer peripheral surface, a plurality of knurls, each of which is convex toward an inside of the light guiding rod and extends in the prescribed direction, the second surface has a plurality of lens cuts, each of the lens cuts extends in a direction that crosses the prescribed direction and includes two side surfaces convex toward the inside of the light guiding rod, the plurality of lens cuts are provided in the predetermined direction, a curved surface which is concave toward the inside of the light guide rod and extends in the predetermined direction is provided between the plurality of knurls.

7. The vehicle lamp according to claim 6, wherein the outer peripheral surface of the light guiding rod further includes a pair of third surfaces that connects the first surface and the second surface to each other, the first surface is a cylindrical surface convex toward the front side and extending in the prescribed direction, and each of the pair of third surfaces is a curved surface convex toward the inside of the light guiding rod.

8. The vehicle lamp according to claim 6, wherein a cross section of the first surface in a plane thereof orthogonal to the prescribed direction is a semi-circular shape that is convex toward the front side.

9. The vehicle lamp according to claim 6, wherein the plurality of lens cuts is provided on the second surface corresponding to the first region, the second region, and the third region.

10. The vehicle lamp according to claim 7, wherein the plurality of lens cuts is provided on the second surface corresponding to the first region, the second region, and the third region.

11. The vehicle lamp according to claim 9, wherein each of the lens cuts is a triangular prism-shaped lens cut which extends in a direction that crosses the prescribed direction.

* * * * *